(12) United States Patent
Futaki

(10) Patent No.: US 11,991,099 B2
(45) Date of Patent: *May 21, 2024

(54) WIRELESS COMMUNICATION SYSTEM, WIRELESS COMMUNICATION METHOD, RADIO STATION AND PROGRAM

(71) Applicant: NEC Corporation, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,149

(22) Filed: Dec. 27, 2022

(65) Prior Publication Data

US 2023/0132975 A1 May 4, 2023

Related U.S. Application Data

(63) Continuation of application No. 16/561,118, filed on Sep. 5, 2019, now Pat. No. 11,569,948, which is a
(Continued)

(30) Foreign Application Priority Data

Oct. 29, 2009 (JP) .................................. 2009-249499

(51) Int. Cl.
*H04L 5/00* (2006.01)
*H04W 8/26* (2009.01)
(Continued)

(52) U.S. Cl.
CPC ............ *H04L 5/001* (2013.01); *H04L 5/0035* (2013.01); *H04L 5/0062* (2013.01); *H04W 8/26* (2013.01);
(Continued)

(58) Field of Classification Search
CPC .... H04W 74/085; H04W 8/24; H04L 1/0004; H04L 5/0098; H04L 27/2692; H04L 69/18
See application file for complete search history.

(56) References Cited

U.S. PATENT DOCUMENTS 8,559,387 B2    10/2013   Dwyer et al.
8,705,461 B2    4/2014    Bala et al.
(Continued)

FOREIGN PATENT DOCUMENTS

CN    101098294 A    1/2008
CN    101505538 A    6/2009
(Continued)

OTHER PUBLICATIONS

NEC, "Carrier Aggregation and Cell Id", 3GPP TSG-RAN WG2 #67; Shenzhen, China, Aug. 24-28, 2009 R2-094625 (Year: 2009).*
(Continued)

*Primary Examiner* — Siming Liu
(74) *Attorney, Agent, or Firm* — Sughrue Mion, PLLC

(57) ABSTRACT

A first radio base station informs a second radio base station about the configuration information of a second carrier, such as NBC or EC, not having an individual first identifier, as the configuration information of the second carrier is correlated with a first carrier, such as BC, having the individual first identifier. The radio station has a function of performing communication with a radio terminal using simultaneously a plurality of carriers included in the carrier set.

8 Claims, 24 Drawing Sheets

Related U.S. Application Data continuation of application No. 13/504,864, filed as application No. PCT/JP2010/069080 on Oct. 27, 2010, now Pat. No. 10,447,441.

(51) Int. Cl.

| | |
|---|---|
| *H04W 36/00* | (2009.01) |
| *H04W 72/00* | (2023.01) |
| *H04W 92/20* | (2009.01) |

(52) U.S. Cl.
CPC ........ *H04W 36/0069* (2018.08); *H04W 72/00* (2013.01); *H04W 92/20* (2013.01)

(56) References Cited

U.S. PATENT DOCUMENTS

| | | | |
|---|---|---|---|
| 11,569,948 B2* | 1/2023 | Futaki | H04L 5/001 |
| 2003/0103478 A1 | 6/2003 | Eriksson | |
| 2010/0020852 A1 | 1/2010 | Erell et al. | |
| 2010/0034163 A1 | 2/2010 | Damnjanovic et al. | |
| 2010/0103834 A1 | 4/2010 | Gorokhov et al. | |
| 2010/0220674 A1 | 9/2010 | Fu | |
| 2010/0234087 A1 | 9/2010 | Barnhart et al. | |
| 2011/0034175 A1 | 2/2011 | Fong | H04W 72/042 |
| | | | 455/450 |
| 2011/0044259 A1 | 2/2011 | Nimbalker | H04L 5/001 |
| | | | 370/329 |
| 2011/0081898 A1 | 4/2011 | Park | |
| 2011/0134877 A1 | 6/2011 | Noh et al. | |
| 2011/0149912 A1 | 6/2011 | Jung et al. | |
| 2011/0216730 A1 | 9/2011 | Kim | H04L 5/0092 |
| | | | 370/329 |
| 2012/0002643 A1 | 1/2012 | Chung | H04L 5/001 |
| | | | 370/331 |
| 2012/0087276 A1 | 4/2012 | Huang | H04B 7/155 |
| | | | 370/253 |
| 2012/0213089 A1 | 8/2012 | Shi | H04L 5/001 |
| | | | 370/241 |

FOREIGN PATENT DOCUMENTS

| | | |
|---|---|---|
| CN | 101496436 A | 7/2009 |
| CN | 101548516 A | 9/2009 |
| WO | 2008085009 A1 | 7/2008 |
| WO | 2009/127512 A1 | 10/2009 |

OTHER PUBLICATIONS

3rd Generation Partnership Project: Technical Specification Group Radio Access Network: Evolved Universal Terrestial Radio Access Network (E-UTRAN); Radio Resource Control (RRC); Protocol specification (release 8), 3GPP TS 38.331 V8.5.0, Jun. 2008, pp. 1-207.
Ericsson, "Support for Carrier Aggregation", 3GPP TSG-RAN WG3 #63-bis, R3-080927, Mar. 26, 2009, 2 pages in total.
Huawei, "Carrier aggregation in active mode", 3GPP TSG-RAN WG2 Meeting #66, R2-093104, May 4, 2009, total 4 pages.
3rd Generation Partnership Project: Technical Specification Group Radio Access Network; Evolved Universal Terrestial Radio Access Network (E-UTRAN); X2 application protocol (X2AP) (release 8), 3GPP TS 36.423 V8.6.0, Jun. 2009, pp. 1-100.
"Carrier Aggregation and Cell Io", NEC. 3GPP TSG-RAN WG2 #67, R2-094625, Shenzhen, China. Aug. 24-28, 2009, pp. 1-4.
Communication dated May 31, 2016 issued by the Japanese Patent Office in corresponding application No. 2015-149160.
Communication dated Jun. 9, 2017 from the European Patent Office in counterpart Application No. 10826775.8.
"3rd Generation Partnership Project: Technical Specification Group Radio Access Network; Evolved Universal Terrestrial Access Network (E-UTRAN): X2 signaling transport (Release 8)", 3GPP TS S6.422. V8.5.0, Mar. 2009, pp. 1-8 (total 6 pages).
3rd Generation Partnership Project; Technical Specification Group Radio Access Network; Further Advancements for (E-UTRAN); Physical Layer Aspects (release 9), 3GPP TR 36.814 V0.4.1, Feb. 2009, pp. 1-31.
Communication dated Apr. 2, 2014, issued by the State Intellectual Property Office of the People's Republic of China in corresponding Application No. 201080049732.X.
CATT, "Handover for Carrier Aggregation", 3GPP TSG RAN WG2 Meeting #66bis, R2-093722, Jun. 29, 2009, total 3 pages.
Communication dated Jul. 30, 2010 from Japanese Patent Office in counterpart Application No. 2018-208892.
"Mobility ard Carrier Aggregation Signaling", NEC, 3GPP TSG-RAN WG2 #67bis, R2-095949, Miyasaki Japan, Oct. 12-16, 2009, pp. 1-2.
NEC, "Component carrier configuration/activation for carrier aggregation", 3GPP TSG-RAN WG2#67bis. R2-095576, Oct. 6, 2009, 3 pages in total.
CATT et al., "Carrier Aggregation for LTE-A", 3GPP TSG RAN WG1 meeting #55bis, R1-090187, Jan. 12, 2009, total 3 pages.
"3rd Generation Partnership Project: Technical Specification: Group Radio Access Network; Evolved Universal Terrestrial Radio Access Network (E-UTRAN): X2 general aspects and principles (Release 8)", 3GPP TS 36.420, V8.1.0 (Dec. 2008), pp. 1-12 (total 12 pages).
International Search Report for PCT/JP2010/068060 dated Nov. 22, 2010
U.S. Appl. No. 61/159,862; PTO-892 attached to the Final Office Action dated Dec. 13, 2018 in parent U.S. Appl. No. 13/504,864.
Communication dated Oct. 16, 2019, from the European Patent Office in counterpart European Application No. 19198800.6.
"3rd Generator: Partnership Project: Technical Specification Group Radio Access Network; Evolved Universal Terrestrial Radio Access Network (E-UTRAN); X2 application protocol (X2AP) (Release 9)", 3GPP TS 36.423 V9.0.0. Sep. 2009, Valbonne. France, pp. 1-102 (102 pages total).
Communication dated Apr. 22, 2020, from the China National Intellectual Property Application No. 201810072640.1.
Communication dated Oct. 20, 2020, from the Japanese Patent Office in application No. 2019165197.
MediaTek Inc., "Discussion on Carrier Type Indication for Bandwidth Extension in LTE-Advanced", 3GPP TSG-RAN WG1 #58bis, R1-094059, Oct. 6, 2009, Japan.
Japanese Office Action for JP Application No. 2019-155197 dated Aug. 17, 2021 with English Translation.
NEC, Carrier Aggregation and Call Id, 3GPP TSG-RAN WG 2 #67 R2-094625, 2009, Aug. 18, 2016 (Year: 2016).
Media Tek Inc., "Discussion on Carrier Type Indication for Band LTE-Advanced", 3GPP TSG-RAN WG1 #58bis, R1-094069, Oct. 6, 2009, JAPN (Year: 2009).

* cited by examiner

FIG. 2

Message Type

| IE/Group Name | Presence | Range | IE type and reference | Semantics description |
|---|---|---|---|---|
| Procedure Code | M | | INTEGER (0..255) | "0" = Handover Preparation<br>"1" = Handover Cancel<br>"2" = Load Indication<br>"3" = Error Indication<br>"4" = SN Status Transfer<br>"5" = UE Context Release<br>"6" = X2 Setup<br>"7" = Reset<br>"8" = eNB Configuration Update<br>"9" = Resource Status Reporting Initiation<br>"10" = Resource Status Reporting<br>"11" = Private Message |
| Type of Message | M | | CHOICE (Initiating Message, Successful Outcome, Unsuccessful Outcome, ...) | |

FIG. 4

X2 SETUP REQUEST

| IE /GROUP Name | Presence | Range | IE type & reference | Semantics description |
|---|---|---|---|---|
| Message Type | M | | | "6" = X2 Setup |
| Global eNB ID | M | | | |
| Served Cells | | 1 to maxCellineNB | | This is all the eNB cells |
| >Served Cell Information | M | | | |
| >Served Carrier Information | O | | | Served carrier used for Carrier aggregation |
| >Neighbour Information | | 0 to maxnoofNeighbours | | |
| >>ECGI | M | | | E-UTRAN Cell Global Identifier of the neighbour cell |
| >>PCI | M | | INTEGER (0..503, ...) | Physical Cell identifier of the neighbour cell |
| >>EARFCN | M | | | DL EARFCN for FDD and EARFCN for TDD |
| GU Group Id List | | 0 to maxPools | | This is all the pools to which the eNB belongs to |
| >GU Group Id | M | | | |

FIG. 5

Served Cell Information

| IE/Group Name | Presence | Range | IE type and reference | Semantics description |
|---|---|---|---|---|
| PCI | M | | INTEGER (0..503, ...) | Physical Cell ID |
| Cell ID | M | | ECGI | |
| TAC | M | | OCTET STRING(2) | Tracking Area Code |
| Broadcast PLMNs | | 1..<maxnoof BPLMNs> | | Broadcast PLMNs |
| >PLMN Identity | M | | | |
| CHOICE EUTRA-Mode-Info | M | | | |
| >FDD | | | | |
| >>FDD Info | | | | |
| >>>UL EARFCN | M | | | Corresponds to $N_{UL}$ |
| >>>DL EARFCN | M | | | Corresponds to $N_{DL}$ |
| >>>UL Transmission Bandwidth | M | | Transmission Bandwidth | |
| >>>DL Transmission Bandwidth | M | | Transmission Bandwidth | |
| ... | ... | | | ... |

FIG. 6

Served Carrier Information

| IE/Group Name | Presence | Range | IE type and reference | Semantics description |
|---|---|---|---|---|
| Carrier ID | M | | | |
| Serving PCI | M | | INTEGER (0..503,...) | |
| CHOICE EUTRA-Mode-Info | M | | | |
| >FDD | | | | |
| >>FDD Info | | 1 | | |
| >>>UL EARFCN | M | | | Corresponds to $N_{UL}$ |
| >>>DL EARFCN | M | | | Corresponds to $N_{DL}$ |
| >>>UL Transmission Bandwidth | M | | Transmission Bandwidth | |
| >>>DL Transmission Bandwidth | M | | Transmission Bandwidth | |
| ... | ... | | | |

FIG. 7

Served Carrier Information

| IE /Group Name | Presence | Range | IE type and reference | Semantics description |
|---|---|---|---|---|
| Carrier ID | M | | | |
| Serving Cell ID | M | | ECGI | |
| CHOICE *EUTRA-Mode-Info* | M | | | |
| >*FDD* | | | | |
| >>FDD Info | | 1 | | |
| >>>UL EARFCN | M | | | Corresponds to $N_{UL}$ |
| >>>DL EARFCN | M | | | Corresponds to $N_{DL}$ |
| >>>UL Transmission Bandwidth | M | | Transmission Bandwidth | |
| >>>DL Transmission Bandwidth | M | | Transmission Bandwidth | |
| ... | ... | | ... | ... |

FIG. 8

Load Information

| IE /Group Name | Presence | Range | IE type & reference | Semantics description |
|---|---|---|---|---|
| Message Type | M | | | |
| Cell Information | M | | | |
| >Cell Information Item | | 1 to maxCellineNB | | |
| >>Cell ID | M | | ECGI | Id of the source cell |
| >>UL Interference Overload Indication | O | | | |
| >>UL High Interference Information | | 0 to maxCellineNB | | |
| >>>Target Cell ID | M | | ECGI | Id of the cell for which the HII is meant |
| >>>Target Carrier ID | O | | | |
| >>>UL High Interference Indication | M | | | |
| >> Relative Narrowband Tx Power (RNTP) | O | | | |
| Carrier Information | O | | | |
| >Carrier Information Item | | 0 to maxCellineNB | | |
| >>Carrier ID | M | | | |
| >>UL Interference Overload Indication | O | | | |
| >>UL High Interference Information | | | | |
| >>>Target Cell ID | M | | ECGI | Id of the cell for which the HII is meant |
| >>>Target Carrier ID | O | | | |
| >>>UL High Interference Indication | M | | | |
| >> Relative Narrowband Tx Power (RNTP) | O | | | |

FIG. 9

Load Information

| IE/Group Name | Presence | Range | IE type and reference | Semantics description |
|---|---|---|---|---|
| Message Type | M | | | |
| Cell Information | M | | | |
| > Cell Information Item | | 1 to maxCellineNB | | |
| >> Cell ID | M | | ECGI | Id of the source cell |
| >> Carrier ID | O | | | |
| >> UL Interference Overload Indication | O | | | |
| >> UL High Interference Information | | 0 to maxCellineNB | | |
| >>> Target Cell ID | M | | ECGI | Id of the cell for which the HII is meant |
| >>> Target Carrier ID | O | | | |
| >>> UL High Interference Indication | M | | | |
| >> Relative Narrowband Tx Power (RNTP) | O | | | |

FIG. 10

RESOURCE STATUS REQUEST

| IE/Group Name | Presence | Range | IE type and reference | Semantics description |
|---|---|---|---|---|
| Message Type | M | | | "g" = Resource Status Reporting Initiation |
| eNB1 Measurement ID | M | | INTEGER (1..4095,...) | Allocated by eNB$_1$ |
| eNB2 Measurement ID | C-ifRegistrationRequestStop | | INTEGER (1..4095,...) | Allocated by eNB$_2$ |
| Registration Request | M | | ENUMERATED(Start, Stop, ...) | In this Release, if the value is set to "stop", the receiver shall stop all cells measurement. |
| Report Characteristics | O | | BITSTRING (SIZE(32)) | Each position in the bitmap indicates measurement object the eNB$_2$ is requested to report. First Bit = PRB Periodic. Second Bit = TNL Load Ind Periodic. Third Bit = HW Load Ind Periodic. Fourth Bit = Traffic Load Ind Periodic. Bits 5 to 32 shall be ignored by the eNB$_2$ |
| Cell To Report | | 1 to maxCellineNB | | Cell ID list for which measurement is needed |
| >Cell ID | M | | ECGI | |
| >Carrier ID | O | | | |
| Reporting Periodicity | O | | ENUMERATED(1000ms, 2000ms, 5000ms, 10000ms, ...) | |

FIG. 11

RESOURCE STATUS UPDATE

| IE /Group Name | Presence | Range | IE type and reference | Semantics description |
|---|---|---|---|---|
| Message Type | M | | | "0" = Resource Status Reporting |
| eNB1 Measurement ID | M | | INTEGER (1..4095,...) | |
| eNB2 Measurement ID | M | | INTEGER (1..4095,...) | |
| Cell Measurment result | | 1 to maxCellineNB | | |
| >Cell ID | M | | ECGI | |
| >Carrier ID | O | | | |
| >Hardware Load Indicator | O | | | |
| >S1 TNL Load Indicator | O | | | |
| >Radio Resource Status | O | | | |
| >Traffic Load Indicator | O | | | |

FIG. 12

Served Cell Information

| IE/Group Name | Presence | Range | IE type and reference | Semantics description |
|---|---|---|---|---|
| PCI | M | | INTEGER (0..503, ...) | Physical Cell ID |
| Cell ID | M | | ECGI | |
| Carrier ID | M | | | |
| TAC | M | | OCTET STRING(2) | Tracking Area Code |
| Broadcast PLMNs | | 1..<maxnoofBPLMNs> | | Broadcast PLMNs |
| >PLMN Identity | M | | | |
| CHOICE EUTRA-Mode-Info | M | | | |
| >FDD | | | | |
| >>FDD Info | | 1 | | |
| >>>UL EARFCN | M | | | |
| >>>DL EARFCN | M | | | |
| >>>UL EARFCN2 | O | | | |
| >>>DL EARFCN2 | O | | | |
| >>>UL EARFCN3 | O | | | |
| >>>DL EARFCN3 | O | | | |
| ... | | | | ... |

FIG. 13

Served Cell Information

| IE/Group Name | Presence | Range | IE type and reference | Semantics description |
|---|---|---|---|---|
| PCI | M | | INTEGER (0..503, ...) | Physical Cell ID |
| Cell ID | M | | ECGI | |
| CellFlag | M | 1..<maxnoofAggCarrs> | BIT STRING | Each position in the bitmap represents a carrier (first bit=carrier 0 and so on), for which value "1" indicates 'serving carrier' |
| TAC | M | | OCTET STRING(2) | Tracking Area Code |
| Broadcast PLMNs | | 1..<maxnoofBPLMNs> | | Broadcast PLMNs |
| >PLMN Identity | M | | | |
| CHOICE EUTRA-Mode-Info | M | | | |
| >FDD | | | | |
| >>FDD Info | | 1 | | |
| >>>UL EARFCN | M | | | |
| >>>DL EARFCN | M | | | |
| >>>UL EARFCN2 | O | | | |
| >>>DL EARFCN2 | O | | | |
| >>>UL EARFCN3 | O | | | |
| >>>DL EARFCN3 | O | | | |
| ... | | | | ... |

FIG. 15

ENB CONFIGURATION UPDATE

| IE/Group Name | Presence | Range | IE type and reference | Semantics description |
|---|---|---|---|---|
| Message Type | M | | | "8" = eNB Configuration Update |
| Served Cells To Add | | 0 to maxCellineNB | | |
| >Served Cell Information | M | | | |
| >Served Carrier Information | O | | | |
| >Neighbour Information | | 0 to maxnoofNeighbours | | |
| >>ECGI | M | | | |
| >>PCI | M | | INTEGER (0..503, ...) | |
| >>EARFCN | M | | | DL EARFCN for FDD |
| Served Cells To Modify | | 0 to maxCellineNB | | |
| >Old ECGI | M | | | old E-UTRAN Cell Global Identifier |
| >Served Cell Information | M | | | |
| >Served Carrier Information | O | | | |
| >Neighbour Information | | 0 to maxnoofNeighbours | | |
| >>ECGI | M | | | |
| >>PCI | M | | INTEGER (0..503, ...) | |
| >>EARFCN | M | | | |

FIG. 16

Message Type

| IE/Group Name | Presence | Range | IE type and reference | Semantics description |
|---|---|---|---|---|
| Procedure Code | M | | INTEGER (0..255) | "0" = Handover Preparation<br>"1" = Handover Cancel<br>"2" = Load Indication<br>"3" = Error Indication<br>"4" = SN Status Transfer<br>"5" = UE Context Release<br>"6" = X2 Setup<br>"7" = Reset<br>"8" = eNB Configuration Update<br>"9" = Resource Status Reporting Initiation<br>"10" = Resource Status Reporting<br>"11" = Private Message<br>"12" = Carrier Aggregation Indication |
| Type of Message | M | | CHOICE (Initiating Message, Successful Outcome, Unsuccessful Outcome, ...) | |

FIG. 17

Served Cell Inforamtion

| IE/Group Name | Presence | Range | IE type and reference | Semantics description |
|---|---|---|---|---|
| PCI | M | | INTEGER (0..503, ...) | Physical Cell ID |
| Cell ID | M | | ECGI | |
| TAC | M | | OCTET STRING(2) | Tracking Area Code |
| Carrier Type | M | | | Component Carrier Type |
| Broadcast PLMNs | | 1..<maxnoof BPLMNs> | | Broadcast PLMNs |
| >PLMN Identity | M | | | |
| CHOICE *EUTRA-Mode-Info* | M | | | |
| >FDD | | 1 | | |
| >>FDD Info | | | | |
| >>>UL EARFCN | M | | | Corresponds to $N_{UL}$ |
| >>>DL EARFCN | M | | | Corresponds to $N_{DL}$ |
| >>>UL Transmission Bandwidth | M | | Transmission Bandwidth | |
| >>>DL Transmission Bandwidth | M | | Transmission Bandwidth | |
| ... | | | ... | |

FIG. 18

Served Carrier Information

| IE/Group Name | Presence | Range | IE type and reference | Semantics description |
|---|---|---|---|---|
| Carrier ID | M | | | |
| Serving Cell ID | M | | ECGI | |
| Carrier Type | M | | | Component Carrier type |
| CHOICE EUTRA-Mode-Info | M | | | |
| >FDD | | | | |
| >>FDD Info | | 1 | | |
| >>>UL EARFCN | M | | | Corresponds to $N_{UL}$ |
| >>>DL EARFCN | M | | | Corresponds to $N_{DL}$ |
| >>>UL Transmission Bandwidth | M | | Transmission Bandwidth | |
| >>>DL Transmission Bandwidth | M | | Transmission Bandwidth | |
| ... | ... | | | ... |

FIG. 19

Served Cell Information

| IE/Group Name | Presence | Range | IE type and reference | Semantics description |
|---|---|---|---|---|
| PCI | M | | INTEGER (0..503, ...) | Physical Cell ID |
| CellID | M | | ECGI | |
| TAC | M | | OCTET STRING(2) | Tracking Area Code |
| CA Set Identity | O | | | Carrier Aggregation set number |
| Broadcast PLMNs | | 1..<maxnoof BPLMNs> | | Broadcast PLMNs |
| >PLMN Identity | M | | | |
| CHOICE EUTRA-Mode-Info | M | | | |
| >FDD | | 1 | | |
| >>FDD Info | | | | |
| >>>UL EARFCN | M | | | Corresponds to N$_{UL}$ |
| >>>DL EARFCN | M | | | Corresponds to N$_{DL}$ |
| >>>UL Transmission Bandwidth | M | | Transmission Bandwidth | |
| >>>DL Transmission Bandwidth | M | | Transmission Bandwidth | |
| ... | ... | | | ... |

FIG. 20

Carrier Aggregation Set Indication

| IE/Group Name | Presence | Range | IE type and reference | Semantics description |
|---|---|---|---|---|
| Message type | M | | | "xx" = carrier aggregation set indication (update) |
| CA Set Information | M | | | |
| >CA Set Identity | M | 1 to <maxnoofCAset> | | Carrier Aggregation set |
| >CC Information | M | 1 to <maxnoofCCinCAset> | | |
| >>PCI | M | | INTEGER (0..503...) | Physical Cell ID |
| >>Cell ID | O | | ECGI | |

FIG. 21

Carrier Aggregation Set Indication

| IE/Group Name | Presence | Range | IE type and reference | Semantics description |
|---|---|---|---|---|
| Message type | M | | | "xx" = carrier aggregation set indication (update) |
| CA Set Information | | | | Carrier Aggregation set |
| >CA Set Identity | M | 1 to <maxnoICASet> | | |
| >>CC Information | M | 1 to <maxnoICCinCASet> | | |
| >>>PCI | M | | INTEGER (0..503..) | Physical Cell ID |
| >>>Cell ID | O | | ECGI | |
| >>>Carrier ID | O | | | |
| >>>Carrier Type | O | | | Component Carrier type |

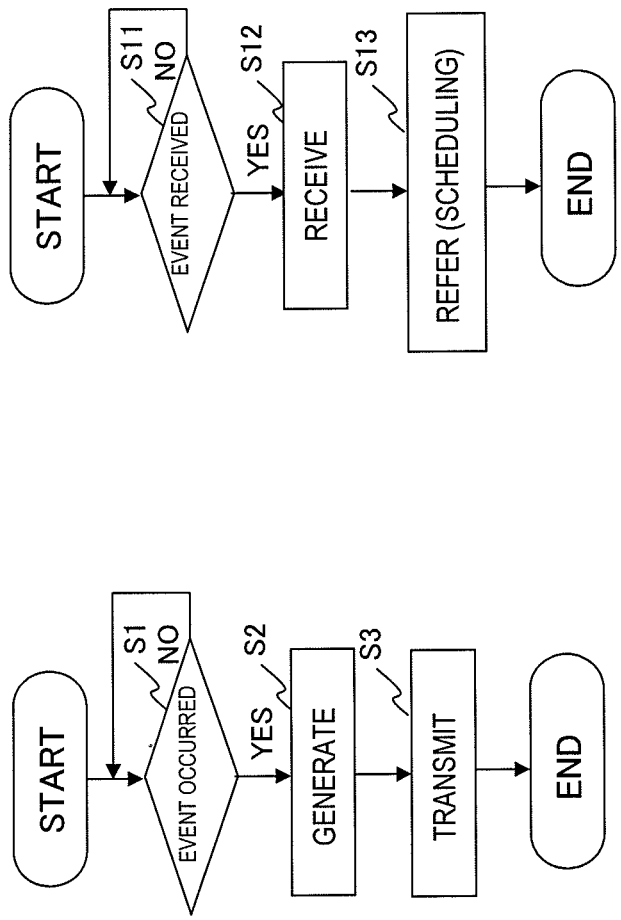

WIRELESS COMMUNICATION SYSTEM, WIRELESS COMMUNICATION METHOD, RADIO STATION AND PROGRAM

CROSS REFERENCE TO RELATED APPLICATIONS

This application is a Continuation application of U.S. application Ser. No. 16/561,118, filed on Sep. 5, 2019, which is a Continuation application of U.S. application Ser. No. 13/504,864, filed on Apr. 27, 2012, which issued as U.S. Pat. No. 10,447,441, which is a National Stage of International Application No. PCT/JP2010/069080, filed on Oct. 27, 2010, which claims priority from Japanese Patent Application No. 2009-249499, filed on Oct. 29, 2009, the contents of all of which are incorporated herein by reference in their entirety.

DESCRIPTION OF RELATED APPLICATION

The present application asserts priority rights based on JP Patent Application 2009-249499 filed in Japan on Oct. 29, 2009. The total contents of disclosure of the patent application of the senior filing date are to be incorporated by reference into the present application.

This invention relates to a communication system and, more particularly, to a radio communication system including a radio terminal and a plurality of radio stations and having the function of sending out and receiving data using a plurality of carriers at the same time. This invention also relates to a radio communication method, a radio station and a program.

BACKGROUND

In a 3GPP (Third Generation Partnership Project) LTE (Long Term Evolution), as one of the next-generation cellular systems, not only an improvement of peak throughput at a radio terminal but also an improvement of cell edge throughput at a radio terminal are required compared to the conventional system, such as WCDMA (Wideband Code Division Multiple Access). Thus, the exchange of the load information (Load Information) between radio base stations (eNBs: evolved NodeBs) is supported (Non-Patent Document 1) and a technique for decreasing inter-cell interference, which is using the load information, is now under investigation.

The load information may include, for example, overload information of uplink interference (Uplink Interference Overload Indication: OI). This information indicates that uplink interference has become excessive, and may be informed on per a given unit of radio resource, termed a physical resource block (PRB). The radio base station, thus informed of the OI (Overload Indication), avoids the physical resource block (PRB), reported to exhibit significant interference, as much as possible, in its scheduling, thereby reducing the interference to neighbor cells. In particular, expectation may be made on improving the throughput in the radio terminal at a cell edge.

On the other hand, standardization of the LTE-Advanced, in which the functions of LTE are further improved, is currently going on. Among the functions of the LTE-Advanced, there is a carrier aggregation (Carrier Aggregation: CA) in which a plurality of component carriers (Component Carriers: CCs) are used simultaneously for a data transmission/reception with a radio terminal (user equipment: UE). The CA represents a function to improve the peak data rate per UE (user equipment). See Non-Patent Document 2.

The component carrier (CC) is a basic frequency block necessary to implement communication between the radio base station and the radio terminal in LTE.

In performing the carrier aggregation (CA), a transport block, which is a data transfer unit from a MAC (Medium Access Control) layer to a PHY (Physical) layer, is transmitted/received using a single component carrier (CC), and signal processing is carried out independently in each of the component carriers (CCs).

In the carrier aggregation (CA), a plurality of component carriers (CCs), each being of the frequency of, for example, 20 MHz at the maximum, are aggregated together in the PHY layer to implement a broad bandwidth up to, for example, 100 MHz at the maximum, with backward compatibility to LTE being maintained. In a UE having the LTE function (LTE terminal), each component carrier is a single LTE carrier. However, in a UE having the LTE-Advanced function (LTE-Advanced terminal), the aggregated bandwidths are used in their entirety. The information on whether or not the carrier aggregation is to be used, or the information on which component carriers are to be aggregated, is provided as individual control information or as system information to the UE having the LTE-Advanced function. In the downlink multiple access system, multiple carrier transmission by OFDM (Orthogonal Frequency Division Multiplexing) is performed in each component carrier.

In the investigation into the carrier aggregation (CA), there have been defined three types of the component carriers (CCs) to be aggregated as follows:

a backward compatible carrier (Backward compatible carrier: abbreviated to 'BC';

a non-backward compatible carrier (Non-backward compatible carrier: abbreviated to 'NBC'; and an extension carrier (Extension carrier: abbreviated to 'EC'.

The BC is a CC that can be accessed by both a UE equipped only with the LTE function and a UE equipped with the LTE-Advanced function.

The NBC is a CC that cannot be accessed by a UE not equipped with the LTE-Advanced function and that can be accessed only by a UE equipped with the LTE-Advanced function.

The EC is a CC that can be accessed only by a UE equipped with the LTE-Advanced function and that is under a constraint that it is to be used as part of a plurality of component carriers (CCs) to be aggregated, i.e., that it cannot be used as a stand-alone CC.

At the present time, discussions are now going on about the basic concept of aggregating (CA aggregating) these different types of the component carriers (CCs).

In these discussions, it is being investigated that, in aggregating (CA aggregating) these different types of the component carriers (CCs), solely the BC (or BC and NBC) has an individual cell ID (PCI: Physical Cell ID and/or ECGI: EUTRAN (Evolved-UMTS Terrestrial Radio Access Network) Cell Global ID), while the NBC and EC (or only EC) lack in the individual cell ID.

The reason that not the NBC or EC but the BC has the individual cell ID is that even the UE of LTE that does not aggregate component carriers is enabled to access the BC. It is noted that there are cases wherein the NBC or EC does not have the individual cell ID, such as PCI, and has allocated thereto a cell ID (PCI) of a BC aggregated as a temporary or pseudo cell ID.

This approach is thought to be effective from the viewpoint that a plurality of component carriers (CCs) aggregated together when carrier aggregation (CA) is performed can be collectively grasped as a cell and a UE can be managed in association with a single cell ID in the same way as when carrier aggregation (CA) is not performed.

Non-Patent Document 1

3GPP TS36. 423v860
(Internet <URL> http: www.3gpp.org/ftp/Specs/html-info/36423. htm)

Non-Patent Document 2

3GPP TR36. 814v100
(Internet <URL> http: www.3gpp.org/ftp/Specs/html-info/36814. htm)

Non-Patent Document 3

3GPP TS36. 331v860
(Internet <URL> http: www.3gpp.org/ftp/Specs/html-info/36331. htm)

SUMMARY

The following is the analysis of the related technique by the present invention.

In LTE, all component carrier (CCs) usually possess individual cell IDs and are controlled as independent cells.

On the other hand, in cell ID configuration in the above mentioned carrier aggregation (CA), only the BC (Backward compatible carrier) or the BC as well as the NBC (Non-backward compatible carrier) has an individual cell ID, while the NBC (Non-backward compatible carrier) as well as the EC (Extension Carrier) or just the EC lacks in the individual cell ID. Hence, if a single BC and a single EC are aggregated together in carrier aggregation (CA), it is possible to advantage that a radio base station (eNB) is able to manage a radio terminal (UE) in association with a single cell ID, in the same way as in case the carrier aggregation is not made.

However, when the information per cell, such as load information, is to be exchanged between eNBs, the information is usually associated with a cell ID. Since the additional NBC or EC does not have the individual cell ID, load information in the NBC or EC as an object of carrier aggregation cannot be associated with the cell ID and hence cannot be exchanged between the eNBs. In case the NBC or the EC uses a BC's individual cell ID as a temporary (pseudo) cell ID, the information of a plurality of carriers cannot be associated with the single temporary (pseudo) cell ID. Hence, the load information again cannot be exchanged between the eNBs.

Such a technique may be contemplated in which the load information in the NBC or EC is estimated from the load information in the BC to make up lacking information about NBC and EC (analysis by the present inventor). This technique will now be considered.

Such a case is now assumed in which, as shown in FIG. 24A, there are radio base stations eNB1 and eNB2 in each of which a single BC, a single NBC and a single EC are aggregated. The horizontal axis is a frequency. The CA set of the eNB1 (set of component carriers being carrier-aggregated) is made up of BC1, NBC1 and EC1 (CA set @eNB1), while the CA set of the eNB2 is made up of BC2, NBC2 and EC2 (CA set @eNB2). It is noted that the number of the component carriers to be aggregated into a single CA set is not limited to '3'.

At this time, the eNB1 and eNB2 exchange overload indicators (Overload Indication: OI: overload information) as the load information in their BCs. However, the eNB1 and eNB2 do not exchange OIs in their NBC or EC.

Consequently, the eNB1 estimates the OIs in NBC2 and EC2 of the eNB2 from the BC2 of the eNB2.

To estimate the OI at NBC2 and EC2 of the eNB2 from the BC2 of the eNB2, it may appear to be proper to use (A) a method of using the OI at the BC2 directly, that is, unmodified, or (B) a method of averaging the values of the OI in the BC2 for the entirety of physical resource blocks (PRBs) to use the averaging outcome as the OI of NBC2 and EC2.

However, the information obtained by the method (A) of directly using the OI at the BC2, may not be useful information since the level of interference per physical resource block (PRB) usually differs from one component carrier (CC) to another.

On the other hand, the information obtained by the method (B) of averaging the values of the OI for the entirety of physical resource blocks (PRBs) also may not be useful information since it cannot be used for control of each physical resource block (PRB) or for control of multiple physical resource blocks (PRBs) as a unit.

The interference level, obtained by averaging for the entirety of physical resource blocks, may also not be useful information since there will be a situation that the interference level, obtained by averaging for the entirety of physical resource blocks, differ from one component carrier (CC) to another.

Such a case is now presupposed that the combination of the component carriers (CCs) to be aggregated in carrier aggregation (CA) at the radio base station eNB1 differs from that at the radio base station eNB2, as shown in FIG. 24B. Such situation may arise in such a system where each eNB is able to determine on its own the component carriers (CCs) to be aggregated in carrier aggregation (CA) depending on e.g., the traffic. A CA set 1 of eNB1 is BC1, NBC1, EC1 (CA set1@eNB1), while its CA set 2 is EC1, NBC3 and BC3 (CA set2@eNB1). A CA set 1 of eNB2 is BC2, NBC2, EC2 (CA set1@eNB2), while its CA set 2 is EC2, NBC4, BC4 (CA set 2@eNB2).

In a method of estimating the load information of the NBC or the EC, based on the load information of the BC, when the component carrier referred to is not correct, such as, when the eNB2 has used the information of BC1 of eNB1 to estimate the information of EC1 of eNB1, such a case is apparently conceived that the so used information differs appreciably from inherent load information of EC1. The estimated load information then may not be useful information.

Even if a method of estimating the information, for instance the load information, on the NBC or EC not having the individual cell ID based on from the information on the BC, is used, it is not possible to expect an effect which should inherently be derived from using such information. For example, it is not possible to expect improved throughput that might be brought about by scheduling that takes into consideration an interference level on each physical resource block (PRB).

From the above analysis, the problem to be solved by the present invention is to realize a radio communication system, a method, a radio station, and a program which enable the information on a second carrier aggregated into one carrier set with a first carrier having a first identifier to be exchanged between the radio stations and to be controlled, same as with the first carrier. As a result of intensive researches, the present inventor has invented a technique which should provide a solution to the above problem, as will now be explained.

According to the present invention, there is provided a radio communication system, wherein a radio station directly or indirectly informs another radio station about information regarding a second carrier aggregated into one carrier set with at least one first carrier which is a carrier having a first identifier assigned.

According to the present invention, there is also provided a radio communication system, wherein a radio station has a function of performing communication using simultaneously multiple carriers included in a carrier set which is an aggregation of a plurality of carriers having frequencies different from each other, and includes a plurality of the carriers of different types, the radio station informing another base station about information on a carrier of at least one type included in the carrier set.

According to the present invention, there is also provided a radio communication system, wherein a radio station has a function of performing communication using simultaneously multiple carriers included in a carrier set which is an aggregation of a plurality of carriers having frequencies different from each other, and includes a plurality of the carriers of different types, the radio station informing another base station about carrier set information indicating relation between the carrier set and each carrier.

According to the present invention, there is also provided a radio communication method, wherein a radio station directly or indirectly informs another radio station about information regarding a second carrier that is aggregated into one carrier set with at least one first carrier that is a carrier having a first identifier assigned.

According to the present invention, there is also provided a radio station, wherein the radio station directly or indirectly informs another radio station about information regarding a second carrier that is aggregated into one carrier set with at least one first carrier that is a carrier having a first identifier assigned.

According to the present invention, there is also provided a program causing a computer composing a radio station to execute the processing of directly or indirectly informing another radio station about information regarding a second carrier aggregated into one carrier set with at least one first carrier which is a carrier having a first identifier assigned. According to the present invention, there is provided a computer-readable storage medium, such as a semiconductor memory, magnetic or optical disk/device, having the program recorded therein.

According to the present invention, the information regarding the second carrier, aggregated with the first carrier, having an individual first identifier, to a single carrier set, can be exchanged between radio base stations. Hence, the control similar to that exercised for the first carrier may be exercised for the second carrier.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 2 is a diagram illustrating a message type exchanged between radio base stations (eNBs) of a first radio communication system according to the first exemplary embodiment of the present invention.

FIG. 4 is a diagram illustrating an X2 connection setup request in the first exemplary embodiment of the present invention.

FIG. 5 is a diagram illustrating the cell information (Served Cell Information) in the first exemplary embodiment of the present invention.

FIG. 6 is a diagram illustrating the carrier information (Served Carrier Information) in the first exemplary embodiment of the present invention.

FIG. 7 is another diagram illustrating the carrier information (Served Carrier Information) in the first exemplary embodiment of the present invention.

FIG. 8 is a diagram illustrating the load information (Load Information) in the first exemplary embodiment of the present invention.

FIG. 9 is another diagram illustrating the load information (Load Information) in the first exemplary embodiment of the present invention.

FIG. 10 is a diagram illustrating a resource status request (Resource State Request) in the first exemplary embodiment of the present invention.

FIG. 11 is a diagram illustrating a resource status request (Resource State Update) in the first exemplary embodiment of the present invention.

FIG. 12 is a diagram illustrating the cell information (Served Cell Information) in a modification of the first exemplary embodiment of the present invention.

FIG. 13 is another diagram illustrating the cell information (Served Cell Information) in a modification of the first exemplary embodiment of the present invention.

FIG. 15 is a diagram illustrating ENB configuration update (ENB Configuration Update) between eNBs in the second exemplary embodiment of the present invention.

FIG. 16 is a diagram illustrating message types exchanged between radio base stations (eNBs) in a third exemplary embodiment of the present invention.

FIG. 17 is a diagram illustrating the cell information (Served Cell Information) in a fourth exemplary embodiment of the present invention.

FIG. 18 is another diagram illustrating the cell information (Served Carrier Information) in the fourth exemplary embodiment of the present invention.

FIG. 19 is a diagram illustrating the cell information (Served Cell Information) in a fifth exemplary embodiment of the present invention.

FIG. 20 is a diagram illustrating the CA set information (Carrier Aggregation Set Indication) in the fifth exemplary embodiment of the present invention.

FIG. 21 is a diagram illustrating the CA set information (Carrier Aggregation Set Indication) in the fifth exemplary embodiment of the present invention.

FIGS. 23A and 23B are flowcharts for illustrating the operation of the radio base station.

EMBODIMENTS

Figure 1:
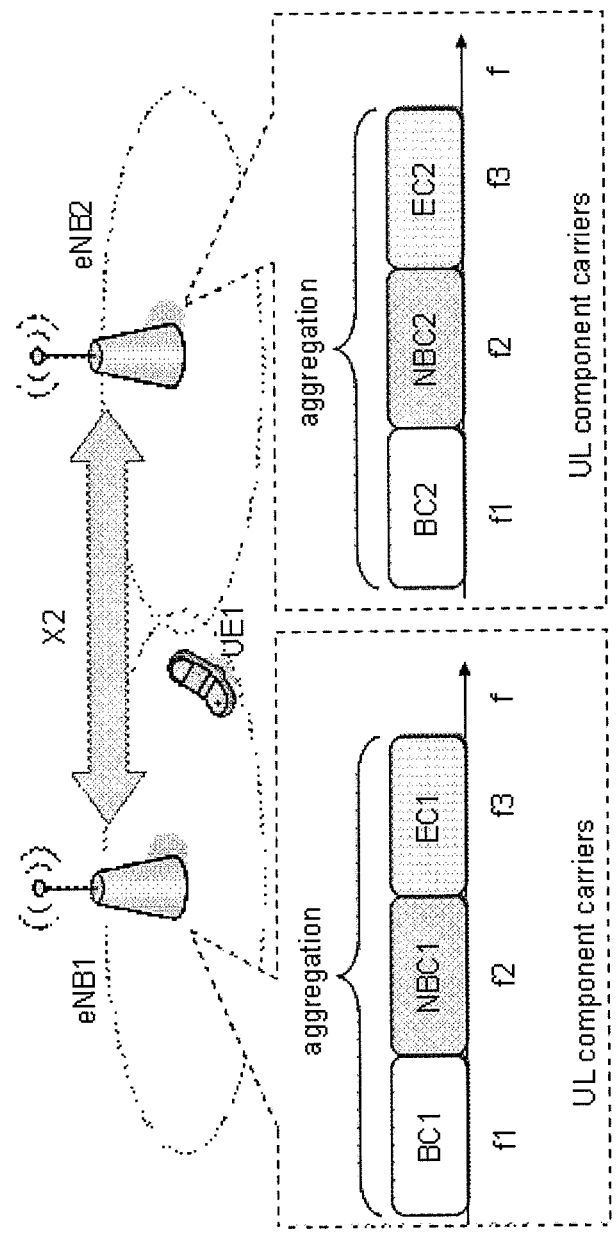
FIG. 1 is a diagram illustrating an arrangement of a first radio communication system according to a first exemplary embodiment of the present invention.

The following describes exemplary embodiments of the present invention. In a communication system according to one of embodiments of the present invention, a radio station equipped with a function of performing data communication with a radio terminal, using a carrier set composed of a plurality of component carriers (CCs) which have different frequencies and are aggregated together, communicates information on component carriers not having a first identifiers, referred to as 'second carriers', such as NBCs or ECs, to another radio base station, in addition to information on component carriers having individual first identifiers, referred to as 'first carriers', such as BCs. In the description to follow, it is assumed that the first and second carriers are so classified according as the component carriers, aggregated into one carrier set, have or do not have first identifiers. It is noted that a given carrier set may be composed of at least one first carrier and at least one second carrier, or may be composed only of a plurality of carriers having the first identifiers. Obviously, the present invention may be applied to such an embodiment in which the first identifiers common to those assigned to the first carrier are assigned to the second carriers.

According to the present invention, the first carrier having the individual first identifier is correlated with the second carrier not having the individual first identifier. The information about the second carrier, not having the individual first identifier, such as the configuration information of the second carrier, is then notified to the other radio station. The load information or the information on a resource usage status of the second carrier, not having the individual first identifier, is also notified to the other radio station to avoid an inter-cell interference or to perform load balancing using the load information or the information on the resource usage status.

According to the present invention, a carrier set includes a plurality of different types of carriers, such as BCs, NBCs or ECs, and the information on one or more carriers of at least one type included in the carrier set may be notified to the other radio station. Or, the carrier set information indicating the relation between the carrier set and the carriers (the information on which carrier set a given carrier belongs to and/or the information on which carriers are included in the carrier set) may be notified to the other radio station.

According to the present invention, the load information or the information on the resource usage status in the second carrier not having the individual first identifier may be exchanged between radio stations. By applying an interference avoidance technique in the second carrier using the load information or the information on the resource usage status, it is possible to improve a throughput or to perform load balancing.

The following describes one of exemplary embodiments of the present invention in detail with reference to the drawings. In the description to follow, it is supposed that '3GPP LTE (Long Term Evolution)' is adopted as a radio communication system (cellular system).

<Embodiment of a First Radio Communication System>

FIG. 1 illustrates an example of an outline configuration of a radio communication system according to a embodiment of the present invention. This radio communication system includes radio base stations (eNBs: evolved NodeBs) eNB1, eNB2, and a radio terminal (UE: User Equipment) UE1.

There are three types of component carriers (CCs) that can be aggregated in carrier aggregation (CA). These are a backward compatible carrier (Backward compatible carrier: BC), a non-backward compatible carrier (Non-backward compatible carrier: NBC) and an extension carrier (EC).

The eNB1 uses BC1, NBC1 and EC1 as a carrier set (CA set). Similarly, the eNB2 uses BC2, NBC2 and EC2 as another carrier set (CA set). It is to be noted that the number of the component carriers included in one CA set is not limited to '3'.

It is assumed that the UE1 has completed the connection (RRC (Radio Resource Control) Connection) setup to communicate with the eNB1, the BC1, NBC1 and the EC1 are ready for use already. The frequencies f1 to f3 may be continuous or non-continuous, and the frequency bands may be the same or different.

It is basically assumed that the BC is a first carrier having a first identifier and that the NBC and the EC are second carriers not having the first identifiers. However, the present invention may be applied to such a case where the BC and the NBC are first carriers having the first identifiers and only the EC is the second carrier.

It is noted that, as the first identifier, a physical (layer) cell ID (PCI: Physical (Layer) Cell Identifier) and/or a global cell ID (ECGI: EUTRAN Cell Global Identifier), for example, may be applied.

In a transmission link, provided for exchanging the information, a link termed X2 (communication connection) is established between eNB1 and eNB2, and information may be exchanged via this X2. Even if the eNB1 and eNB2 are not linked directly to each other over X2, information may be exchanged between eNB1 and eNB2 over a link S1 which is a link to an upper station (MME: Mobility Management Entity). The information may be exchanged via O&M (Operation and Maintenance server) or NM (Network manager). Or, the radio base station may be controlled by the O&M or NM using the following information:

<Information Exchange by Messages Over X2>

FIG. 2 shows message types (Message Types) in case information exchange is performed over X2.

Relevant numbers are entered in "Procedure code" IE (Information Element). In the present exemplary embodiment, it is indicated that the numbers 0 to 11 are allotted as "Procedure codes". However, it is as a matter of course possible to provide, under the number 12 or any other suitable number, the message type dedicated to transmission of the component carrier information of the carrier aggregation (CA).

The source eNB which sends the information over X2, and the destination eNB may confirm this IE number to get common recognition (common consciousness) as to what is the information being transmitted and received.

According to the present invention, the information exchanged over X2 includes, in addition to the information exchanged at the time of a normal X2 connection setup (X2 setup), the following information:

configuration information of a component carrier (CC), among the component carriers to be aggregated by carrier aggregation (CA), which does not have the individual first identifier and which operates as part of the component carriers (CC) to be aggregated by carrier aggregation (CA) (second carrier);

load information (Load Information) in the component carrier (CC) (the second carrier);

information on a resource usage status (Resource Status) and so forth.

The individual first identifier may be exemplified by the physical (layer) cell (PCI) and the global cell ID (ECGI).

The configuration information of a component carrier (CC) not having the individual first identifier (second carrier), may be exemplified by information indicating, among the component carriers (CCs) of the carrier set (CA set) the second carrier belongs to, which is the component carrier (CC) having the individual first identifier exemplified by an ECGI (first carrier);

a frequency of the first carrier;

a system bandwidth;

a type of the component carrier (CC type) (BC/NBC/EC) and so forth. The BC may be thought of as the first carrier and the NBC and EC may be thought of as the second carrier. However, this is merely illustrative and the NBC or the EC may as well become the first carrier. The types of the component carriers may be other than BC/NBC/EC.

The load information (Load Information) may be exemplified by an uplink interference overload information (Uplink Interference Overload Indication: OI)

an uplink high interference overload information (Uplink High Interference Indication: HII); and a downlink transmission power information (Relative Narrowband Tx Power: RNTP).

The uplink interference overload indication (OI) is the information indicating that the uplink interference has become excessively high, and may be informed in terms of a radio resource block, also called a physical resource block (Physical Resource Block: PRB) as a unit. The OI may be represented by the information:

a high interference (High Interference);

a medium interference (Medium Interference);

a low interference (Low Interference) and so on.

These information may be determined by calculating the signal to interference power ratio (Signal to Interference and Noise Ratio: SINR) of a known uplink signal, also called a reference signal (Reference signal) or a pilot signal (Pilot Signal) and by comparing the so calculated value of the ratio to a plurality of preset threshold values. The SNIR of not the known signal but of the data uplink signal may be calculated and compared to a preset threshold value(s) to give a decision. It is of course possible to use other methods for estimating the uplink interference.

By performing scheduling so as to avoid, as much as possible, a physical resource block (PRB) which is reported to be largely subjected to an interference, it is possible to expect the reduction of an interference to neighboring cells (Neighboring cells) and to improve a throughput, especially at a cell edge.

The uplink high interference overload Indication HII is information indicating whether or not communication is sensitive to uplink interference (High Interference Sensitivity). The information on HII may be transmitted, on a per physical resource block (PRB) basis, in the same way as that on OI. The eNB that has received the HII refrains from allocating a physical resource block (PRB), informed to be sensitive to interference, to the UE at the cell edge as much as possible to reduce an inter-cell interference.

The uplink high interference information (HII) is the information represented by being sensitive to an interference (High interference sensitivity), or by being not sensitive to an interference (Low interference sensitivity).

A decision on being high interference sensitivity or being low interference sensitivity may be given depending on whether or not communication that uses (or is using) a PRB of interest is sensitive to interference (or tolerant to interference). Or, the above decision may be given depending on whether or not the communication that uses (or is using) a PRB of is performed with a radio terminal at the cell edge. In case the communication with the radio terminal at the cell edge, a decision is given that the communication is high interference sensitivity.

The downlink transmission power information (RNTP) is information indicating whether or not the transmission power by the eNB per physical resource block (PRB) is not lower than a preset threshold value. The eNB that has received this RNTP performs scheduling as the received RNTP is taken into consideration.

On the other hand, the resource usage status (Resource Status) may be exemplified by a radio resource usage status (Radio Resource Status);

hardware load information (Hardware Load Indicator);

S1 network load information (S1 TNL Load Indicator) and so forth.

The radio resource usage status (Radio Resource Status) is a usage ratio of each of the uplink (UL) and downlink (DL) radio resources per physical resource block (PRB). Each usage ratio is calculated for each of a guaranteed bit rate (GBR) and a non-guaranteed bit rate (Non-GBR). The GBR and the Non-GBR differ from each other in QoS (Quality of Services). The usage ratio for the guaranteed bit rate (GBR) and that for the non-guaranteed bit rate (Non-GBR) are combined together to a global usage ratio. The usage ratio per PRB is represented by percent (%), for example. The usage ratio may, for example, be a usage ratio per PRB obtained on averaging for a certain time interval T.

The hardware load information (Hardware Load Indicator) indicates a hardware usage ratio per cell and may be informed as stepwise information of several levels, such as LowLoad, MediumLoad, HighLoad, Overload, and so on. The hardware usage ratio is determined by comparing the hardware usage value (degree of usage of hardware) with a plurality of preset threshold values. It is noted that the hardware may be part of devices or circuits (such as a baseband section) installed on a radio base station. Which part of the devices or circuits is to be the hardware is to be determined in common among a plurality of radio base stations.

The S1 TNL load information (S1 TNL Load Indicator) is load information on a S1 transport network layer, and may similarly be notified as the stepwise information, such as LowLoad, MediumLoad, HighLoad, Overload and so on.

It is noted that S1 is a link (transmission link) established between the eNB and the MME (Mobility Management Entity)/S-GW (Serving GateWay). The S1 TNL load information may also be determined by comparing the S1 TNL load with a plurality of preset threshold values. As the S1

TNL load, the total quantity or an average value of the information communicated over the transmission link S1 during a certain time interval, or the total amount or an average value of the information of a particular type(s) communicated over the transmission link S1 during a certain time interval, is used.

By communicating (exchanging) the configuration information of the second carrier, load information or the resource usage status information between radio base stations, it is possible to avoid an inter-cell interference by scheduling that takes the load information on a per PRB basis into account. It is also possible to perform load balancing among the component carriers (CCs). Specifically, for instance, by exchanging the configuration information of the first carrier among the base stations, the information as to with which carrier having an identifier the carrier aggregation has been executed may be shared by the radio base stations. The load information per PRB of the second carrier may also be shared by the radio base stations. It should be rendered unnecessary to calculate the load information in the second carrier using the load information in the first carrier of a differing frequency. The load information of the second carrier on the same frequency as that involved in interference (the frequency as the subject or object of interference) may be used to avoid an inter-cell interference in proper manner. In addition, the load information or the resource usage status of the second carrier on the same frequency may be used to realize proper load balancing among the component carriers.

It is noted that, as for the load balancing, the resource usage status, for example, may be informed to an upper level device, such as MME or O&M (Operation and Maintenance Server, also called OMC (Operation and Maintenance Center)), in order to realize load balancing among the radio base stations as well. In LTE, the BC or the NBC having a physical (layer) cell ID (individual cell ID) (PCI) and a global cell ID (ECGI), where communication can be done by itself may be called a 'cell'. In the exemplary embodiments to follow, these BCs or NBCs are called 'carriers'. However, the present invention may, of course, be applied in case the BCs or NBCs are called 'cells'.

The present radio communication system has a preferred configuration conforming to 3GPP LTE specifications, but only in a non-limiting way. The following describes several exemplary embodiments in connection with the above embodiment.

Exemplary Embodiment 1

Figure 3:
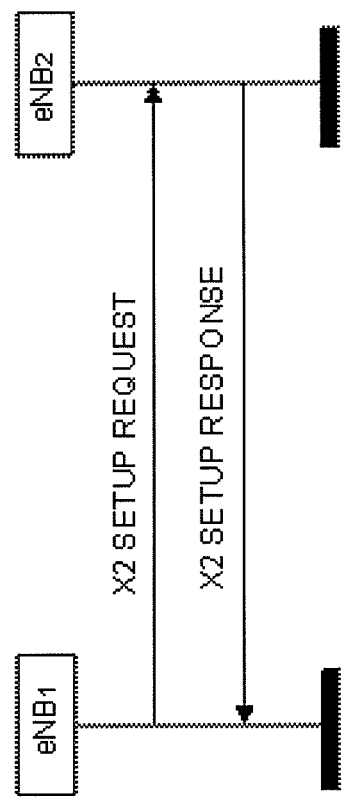
FIG. 3 is a diagram illustrating a sequence of X2 connection setup (SETUP) in the first exemplary embodiment of the present invention.

FIGS. 3 to 11 illustrate a first exemplary embodiment of the present invention.
 <X2 Setup Sequence>
In the present exemplary embodiment, the configuration information of the second carrier is exchanged among eNBs by an X2 connection setup request (X2 SETUP REQUEST) and a response thereto (X2 SETUP RESPONSE), as shown in FIG. 3.
 In X2 SETUP REQUEST, the following information:
 Message Type IE (Information Element);
 Global eNB ID IE;
 Served Cells IE;
 GU (Globally Unique) Group Id List IE and so forth, are usually notified, as shown in FIG. 4.
The served cell information (Served Cell IE) includes
 a served cell information item (Served Cell Information IE); and
 a neighbor information item (Neighbor information IE).

The served cell information (Served Cell Information) includes:
 a physical (layer) cell ID: PCI;
 a global cell ID: ECGI;
 a tracking area code (Tracking Area Code: TAC);
 a public land mobile network identity (Public Land Mobile Network Identity: PLMN (public land mobile network) identifier); and
 FDD information (Frequency Division Duplex (frequency division multiplexing) Info), as shown in FIG. 5.
The FDD information (FDD Info) includes:
 an uplink carrier frequency number (UL EARFCN (EU-TRAN Absolute Radio Frequency Channel Number): this number corresponds to an index of carrier frequency;
 a downlink carrier frequency number (DL EARFCN: this number corresponds to an index of the carrier frequency:
 an uplink transmission bandwidth (UL Transmission Bandwidth);
 a downlink transmission bandwidth (DL Transmission Bandwidth) and so forth.

In the present exemplary embodiment, the served carrier information (Served Carrier Information IE) indicating the information of the second carrier to be aggregated by carrier aggregation (CA) is also notified by X2 SETUP REQUEST per need basis.

Examples of the served carrier information (Served Carrier Information) IE include, as shown in FIG. 6:
 a carrier ID (Carrier ID);
 a serving PCI (Serving PCI);
 FDD information (FDD info) and so forth.
It is noted that the serving PCI is a PCI of a first carrier having a first identifier in a set of component carriers (CCs) to be aggregated by carrier aggregation (CA), wherein the set is a CA set to which a second carrier belongs.

In case there are a plurality of first carriers in a CA set, the serving PCI may be a PCI of a representative one of the first carriers, or PCIs of a plurality of or the entirety of the first carriers.

In case the second carrier belongs to a plurality of CA sets, the serving PCI may be the PCI of the first carrier of one of the CA sets, or PCIs of the first carriers of multiple or all the CA sets.

A carrier ID is an individual number allocated at least to the second carrier. This carrier ID may be a bit sequence of a length equivalent to that of the global cell ID (ECGI) or the physical (layer) cell ID (PCI) inherently possessed by the first carrier, or a bit sequence shorter and simpler than an ECGI or a PCI. The carrier ID may be allocated to each CA set managed by an eNB or allocated to the entire CA sets managed by an eNB.

A frequency offset value to the first carrier frequency may also be used in stead of EARFCN as the information on the frequency of the second carrier.

As another example of the carrier information (Carrier Information IE), a serving cell ID, such as ECGI, may be used in stead of the serving PCI, as shown in FIG. 7. By so doing, the configuration information of the second carrier may be informed to the neighbor eNBs (Neighbor eNBs) in the same way as that of the first carrier.

In the present exemplary embodiment, the PCI and the ECGI are used as the first identifier possessed by the first carrier, and the carrier ID is used as the second identifier possessed by the second carrier. It is however possible to use
 an ECGI as the first identifier; and use
 a carrier ID as the second identifier.

It is also possible to use
an ECGI as the first identifier; and use
a PCI as the second identifier.

Moreover, in the present exemplary embodiment, the load information (Load Information) of the second carrier is also informed to the neighbor eNB, as shown in FIGS. 8 and 9.

The load information IE (Load Information IE) usually includes the following information:
a message type (Message Type);
a cell ID (Cell ID):
uplink interference overload information (UL Interference Overload Indication);
uplink high interference information (UL High Interference Information);
narrowband transmission power information (Relative Narrowband Tx Power) and so forth.

In the present exemplary embodiment, a target carrier is included in addition to an ID of a target cell of the uplink interference information (UL High Interference Information IE). Moreover, a carrier information item (Carrier Information Item) is added in place of the cell information item (Cell Information Item).

The configuration of the carrier information item (Carrier Information Item) is similar to the cell information item (Cell Information Item), with the difference being using the carrier ID in stead of the cell ID.

The resource state (Resource State) of the second carrier is also informed to the neighbor eNB, as shown in FIGS. 10 and 11.

A resource status request (Resource Status Request) usually informs:
a message type (Message Type);
an eNB1 measurement ID (eNB1 Measurement ID);
an eNB2 measurement ID (eNB2 Measurement ID);
a registration request (Registration Request);
a report characteristics of report (Report Characteristics);
a cell to report (Cell to Report);
a reporting periodicity (Reporting Periodicity) and so forth.

According to the present invention, a carrier ID is added besides the 'Cell ID' of a cell to report (Cell to Report).

As characteristics of report (Report Characteristics),
traffic load information (Traffic Load) (Ind Periodic) may be added besides
a physical resource block (PRB) (periodic (Periodic));
a TNL load (TNL Load) (Ind Periodic); and
a hardware load (Ind Periodic).

The traffic load information (Traffic Load) (Ind Periodic) is information indicating the traffic load (Traffic Load) information of each component carrier (CC) by using several step levels (LowLoad, MediumLoad, HighLoad and so on). This traffic load information is periodically reported in accordance with the reporting characteristics (Reporting Periodicity).

This allows scheduling, in the case of carrier aggregation (CA), with taking into the load balancing among the component carriers (CCs) consideration.

In resource state update (Resource State Update), a carrier ID is similarly added, as shown in FIG. 11. It is also possible to add the traffic load information (Traffic Load Indicator).

By so doing, load information (Load Information) and a resource status (Resource Status) of the second carrier may be informed to neighbor eNBs. It is noted that the present invention may apply not only for a case where the second carrier lacks in the first identifier but also for a case where the second carrier reuses the first identifier of the first carrier.

In the latter case, the identifiers may be used for different purposes for the first and second carriers.

Modification of Exemplary Embodiment 1

FIGS. 12 and 13 illustrate a modification of the first exemplary embodiment of the present invention. In the first exemplary embodiment, the served carrier information (Served Carrier Information IE) is defined apart from the served cell information (Served Cell Information) in order to inform the configuration information of the second carrier in FIG. 4. However, instead of doing so, the configuration information of the second carrier may be added to the served cell information (Served Cell Information).

For example, as shown in FIG. 12, carrier frequencies (EARFCN) of additional component carriers (CCs) in the carrier aggregation (CA) are arrayed and informed, while the carrier IDs are also correspondingly informed. In FIG. 12, the carrier frequencies, UL/DL EARFCN2 and UL/DL EARFCN3 of the additional component carriers in the carrier aggregation (CA) are shown in addition to the UL/DL EARFCN.

As shown in FIG. 13, the carrier frequencies (EARFCN) of the additional component carriers (CCs) in the carrier aggregation (CA) may be arrayed and informed, and a cell flag (Cell flag) may also be informed. The cell flag (Cell flag) indicates which component carrier (CC) is the first carrier (a carrier having a unique PCI and/or a carrier having a cell ID). The cell flag (Cell flag) is a bit string from 1 to a maximum number of the component carriers to be aggregated, with the first bit being a carrier 0, for example. 1 stands for a serving carrier.

In FIG. 12, the carrier ID is used as a second identifier possessed by the second carrier. In FIG. 13, a frequency index is used as the second identifier. It is noted that the present invention may apply not only for a case where the second carrier does not have in the first identifier but also for a case where the second carrier reuses the first identifier of the first carrier. In the latter, the identifiers for the first and second carriers may be used for different purposes.

Exemplary Embodiment 2

Figure 14:
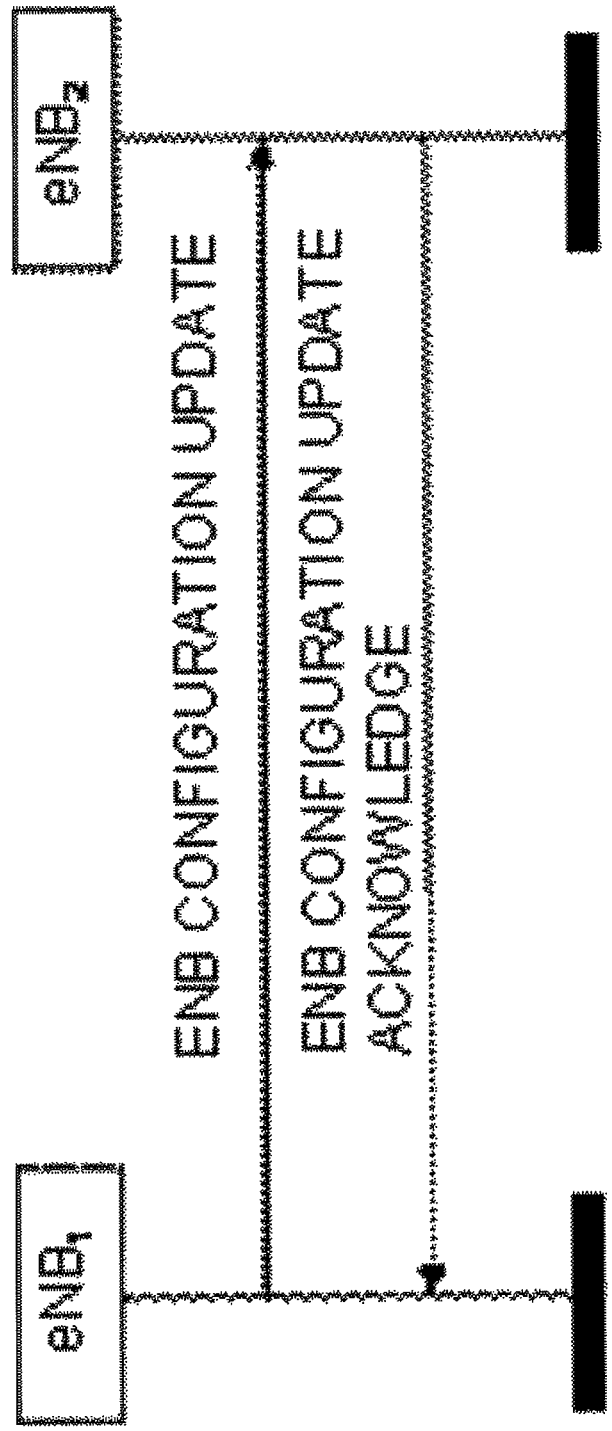
FIG. 14 is a diagram illustrating the sequence of ENB configuration update (ENB Configuration Update) between eNBs in a second exemplary embodiment of the present invention.

FIGS. 14 and 15 illustrate a second exemplary embodiment according to the present invention.
<ENB Configuration Update>

In the present exemplary embodiment, the configuration information of the second carrier is also exchanged in the eNB configuration update (ENB configuration update) and in its response (ENB configuration update ACKNOWLEDGE).

In the eNB configuration update (ENB configuration update), the following information is notified:
a message type (Message Type);
information on the served cell to be added (Served Cells to Add);
information of served cells to be modified (Served Cells to Modify) and so forth.

The information on the served cell to be added (Served Cells to Add) includes served cell information (Served Cell Information) and neighbor information (Neighbor Information; ECGI, PCI and EARFCN).

On the other hand, the information of the served cells to be modified (Served Cells to Modify) includes old ECGI (Old ECGI) in addition to the served cell information (Served Cell Information) and the neighbor cell information (Neighbor Information).

In the present exemplary embodiment, not only the above information but also the served carrier information (Served Carrier Information) is notified to the neighbor eNB. Thus, changes in the CA configuration (changes in the combination of the component carriers (CCs) to be aggregated together or in the configuration of the component carriers (CCs)) may optionally be informed to the neighbor eNBs. The present invention may apply not only for a case where the second carrier does not have the first identifier but also for a case where the second carrier reuses the first identifier of the first carrier. In the latter case, the purpose of the identifier for the first carrier may differ from that of the identifier for the second carrier.

Exemplary Embodiment 3

The following describes a third exemplary embodiment of the present invention will now be described. In the present invention, the exchange of the second carrier configuration information or the like may be performed other than in an X2 connection setup request (X2 SETUP REQUEST) or in an eNB configuration update (eNB configuration update). The new notification or update notification of the CA configuration may also be performed by defining another message type (Message Type).

For example, it may be conceived to add a message type such as 'Carrier Aggregation Indication' or 'Carrier Aggregation Update' newly, as shown in FIG. 16. In the example shown in FIG. 16, 'Carrier Aggregation Indication' is allotted to Procedure Code "12".

In this case, when just the configuration setting of CA is changed, redundant information may be omitted and just the necessary information may be exchanged between the eNBs to reduce the network load. It is noted that the present invention may apply not only for a case where the second carrier does not have the first identifier but also for a case where the second carrier reuses the first identifier of the first carrier. In the latter case, the identifiers may be used for different purposes for the first and second carriers.

Exemplary Embodiment 4

In a fourth exemplary embodiment of the present invention, the information on the types (Carrier Types) of all or specific types of the component carriers (CCs: Component Carriers) is exchanged among the eNBs. For example, the information on the types of the component carriers (CCs) for both the first carrier having the first identifier and the second carrier not having the first identifier, for only the first carriers, or for only the second carriers, is exchanged among the eNBs.

In the LTE-Advanced system which supports carrier aggregation (CA), a plurality of types of the component carriers (CCs), that is, BC: Backward compatible carrier, NBC: Non-backward compatible carrier and EC: Extension carrier, are defined. However, these component carriers have different features. Thus, if just the frequency information of the component carriers (CCs) is simply exchanged between neighbor eNBs, there is fear that unforeseen problems may arise.

For example, the radio terminal conforming to earlier LTE releases, allowing transmission solely for BCs, is unable to have communication even though it is instructed to have communication on the NBC or EC, as a result of which call disconnection or the like may be produced.

This may also happen, for example, in the case of an inter-frequency handover in the same eNB, (Intra-eNB/Inter-frequency Handover, also called Frequency Convergence), in the case of inter-eNB handover (Inter-eNB Handover) and so forth.

Suppose that an eNB instructs a UE to perform quality measurement of neighbor cells. If, in this case, the eNB instructs the UE to perform the measurement without taking into account for what type of the component carrier (CC) the measurement is perform, such problems may arise that the measurement is perform redundantly or perform for such component carriers (CCs) for which the measurement is unnecessary. For example, if the UE which is unable to communicate on the NBC is made to measure the quality of other NBCs, handover may not be executed, and hence the measurement is wasteful.

In the present exemplary embodiment, the type of the component carrier (CC) is informed to neighbor eNBs, in order to avoid such problem.

The specific types of the component carriers (CCs) may be the CCs other than BCs, that is, NBC and ECs or just ECs, only by way of illustration.

FIG. 17 illustrates an example case where the carrier type (Component Carrier type) is added in the served cell information (Served Cell Information) exchanged between eNBs.

Here, the presence (Presence) is M (mandatory). However, the presence may be option (O: Option), and informed only in case of necessity, as described above.

FIG. 18 illustrates an example case where the carrier type (Component carrier type) is added in the served carrier information (Served Carrier Information) exchanged between eNBs.

By informing neighbor eNBs about the carrier type (Carrier type (CC type)), in this manner, it is possible for the neighbor eNBs to make UE's location management (mobility management) or instruct the UE to perform measurement in which the type of the component carrier (CC type) is taken into consideration. For example, the UE that is able to camp and/or communicate only on a BC may be made to execute a handover to a cell consisting of the BC component carrier (CC). On the other hand, the UE that is able to camp and/or communicate not only on a BC but also with an NBC may be made to execute a handover to a cell consisting of the BC component carrier (CC) or the NBC component carrier (CC). By so doing, the load on the handover destination may be distributed as the UE's functional classification (class) is taken into consideration.

It is noted that a flag indicating whether the CC is a BC or, conversely, an NBC or EC, may be used in substitution for the component carrier type (CC type). In informing the neighbor eNB, not the X2 interface, an interface between eNBs, but the S1 interface, an interface between the eNB and the MME (Mobility Management Entity), may also be used. Also, the information on the carrier types may be notified to the O&M (Operation and Maintenance server) or to the NM (Network Manager) so that the O&M or the NM will control e.g., the configuration of the carrier set in each eNB. The present invention may apply not only for a case where the second carrier does not have the first identifier but for a case where the second carrier reuses the first identifier of the first carrier. In the latter case, the identifiers may be used for different purposes for the first and second carriers.

Exemplary Embodiment 5

In a fifth exemplary embodiment of the present invention, the information representing a carrier set (CA set), which is a set of component carriers (CCs: Component Carriers) to be aggregated by CA, that is, the CA set information (CA Set Information), is notified between radio stations (eNBs).

In the LTE-Advanced system which supports the carrier aggregation (CA), it may be conceived to be probable that the CA set configuration differs between the neighbor eNBs (neighbor eNBs), that is, that each eNB is able to decide its own CA set. It is because each eNB basically is able to uniquely decide on radio resource control (RRC: Radio Resource Control) or radio resource management (RRM: Radio Resource Management), provided that a given preset condition is met.

As a given condition for configuring a CA set, there may be provided such a condition stating that, in case a plurality of component carriers (CCs), such as BCs: Backward compatible carriers, NBCs: Non-backward compatible carriers or ECs: Extension carriers, are defined, it is necessary to provide at least one component carrier (CC) of a specific type in each CA set. That is, to accommodate a radio terminal that is able to communicate on BC, the BC is required, and to accommodate a radio terminal that is able to communicate on any of BC and NBC, either the BC or the NBC is required. Or, there may be provided another condition stating that the number of the component carriers (CCs) in each CA set is to be not more than a preset value.

In case the information on the configuration of the CA set is not notified, unintentional problems may arise. For example, in applying a technique for avoiding an inter-cell interference, or in performing a load balancing, control may not be appropriate obtained because of difference in characteristics of each type of the component carriers (CCs). Or, in case a radio terminal (UE) is to perform quality measurement (Measurement) of neighbor cells, the cells as objects of such measurement may become redundant or measurement is performed of such component carriers (CCs) for which no measurement is required.

In the present exemplary embodiment, the eNB informs neighbor eNBs of the carrier set (CA set) information indicating the configurations of CA sets, in order to prevent such problem from occurring. For example, the eNB notifies the neighbor eNBs of the information on which CA set each component carrier (CC) belongs to or on which component carrier(s) (CCs) is included in each CA set.

FIG. 19 illustrates an example in which a CA set identity (CA Set Identity) is informed as the information indicating the CA set configuration in the served cell information (Served Cell Information).

Here, an example of a component carrier having a PCI and a cell ID (ECGI), such as BC, is shown. A CA set identity (CA Set Identity) indicates to which CA set (e.g. number of CA set) each component carrier (CC) having each PCI and each cell ID (ECGI) belongs (Carrier Aggregation set number). Even if the component carriers do not have the PCIs or Cell IDs, it is possible to inform the CA set information along with the information indicating component carriers, such as a Carrier ID.

FIGS. 20 and 21 illustrate an example of informing the carrier set (CA set) information (CA Set Information) as an independent X2 message (Carrier Aggregation Set Indication).

In the example of FIG. 20, the CA set information (CA Set Information) includes:
 a CA set identity (CA Set Identity);
 component carrier (CC) information;
 PCI; and
 cell ID (ECGI).

The example of FIG. 21 is an example that further includes a carrier ID and a carrier type (Carrier Type). By informing the carrier set (CA set) information to neighbor eNBs, it is possible to executed a control, such as for inter-cell interference avoidance, load balancing or the like, in consideration of the component carrier (CC) types. Hence, it may be able to expect that a throughput of the UE is improved and the system is optimized. It is noted that, in informing the carrier set information to the neighbor eNB, not an X2 interface, an interface between the eNBs, but an S1 interface, an interface between the eNB and the MME (Mobility Management Entity), may be used. Moreover, the carrier set information may be informed to the O&M (Operation and Maintenance server) or to the NM (Network Manager) to control the configuration of the carrier set in each eNB by the O&M or the NM. The present invention may apply not only for a case where the second carrier does not have in the first identifier but for a case where the second carrier reuses the first identifier of the first carrier. In the latter case, the identifiers may be used for different purposes for the first and second carriers.

Figure 22:
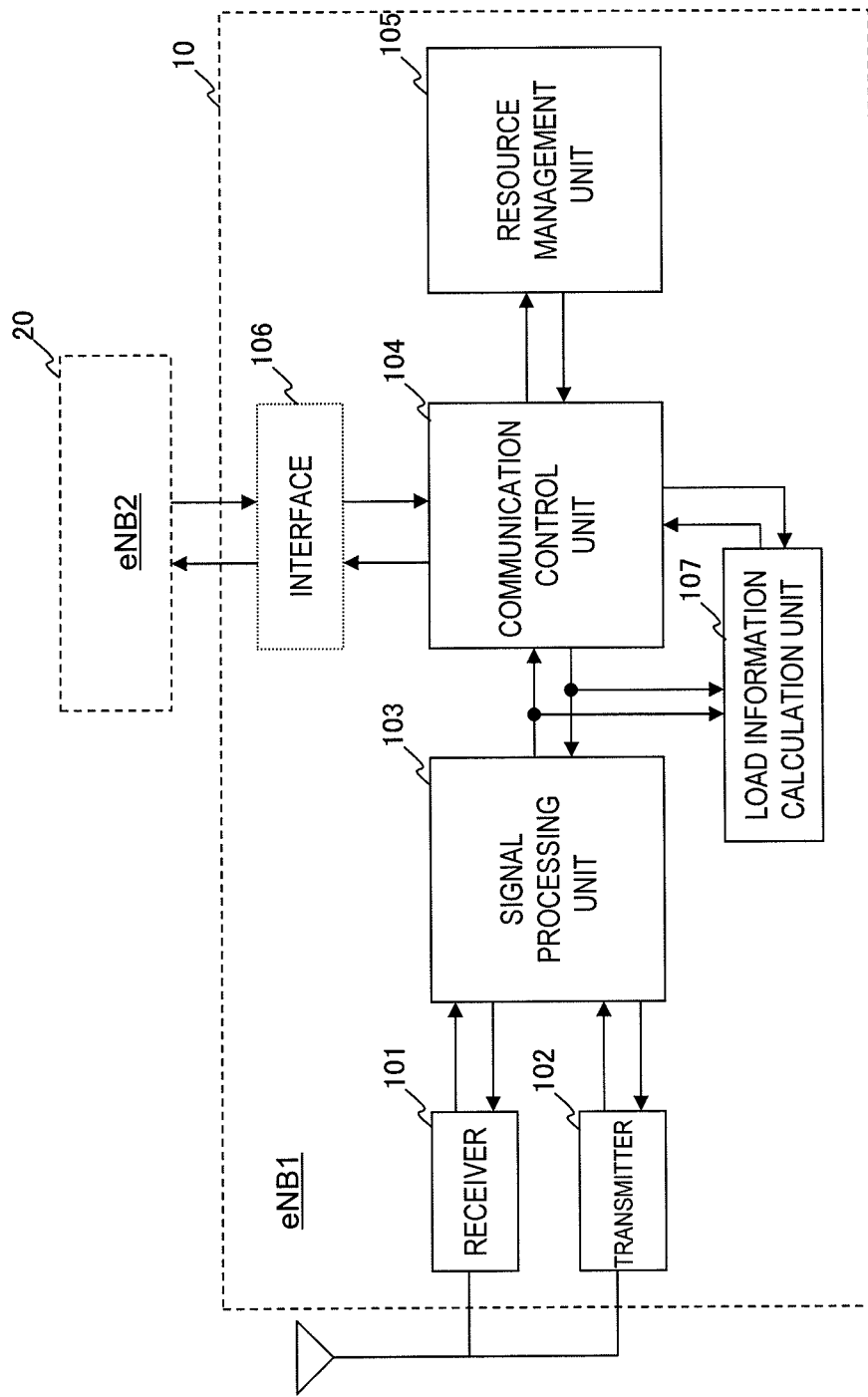
FIG. 22 is a block diagram illustrating an example arrangement of a radio base station.
Figure 24A:
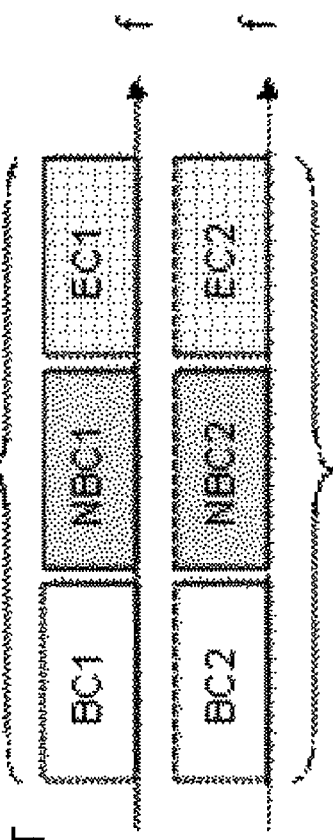
FIGS. 24A and 24B are diagrams illustrating the related technique.
Figure 24B:
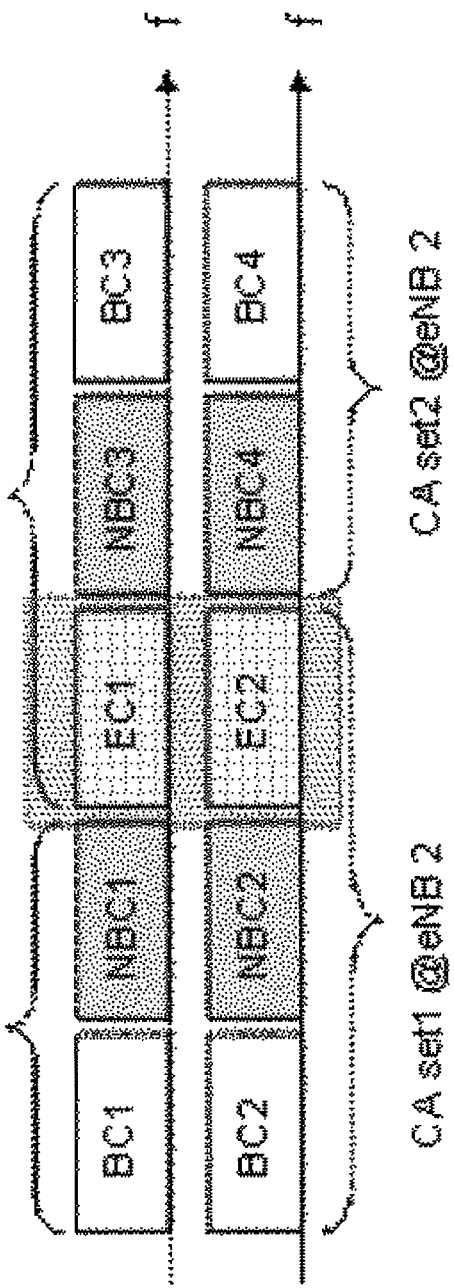

FIG. 22 is a block diagram illustrating an example configuration of a radio base station eNB1 (10). Another radio base station eNB2 (20) has a similar configuration. Referring to FIG. 22, the eNB1 includes a receiver 101, a transmitter 102, a signal processing unit 103, a communication controller 104, a resource management unit 105, an interface 106 and a load information calculation unit 107. The transmitter 102 and the receiver 101 transmits/receives signals exchanged with a radio terminal UE. The signal processing unit 103 performs data restoration from a signal received in communication with the UE as well as generation of a transmission signal from downlink data. The communication controller 104 controls data transmission/reception and information exchange with another radio base station. The load information calculation unit 107 calculates a radio resource load or the like. The resource management unit 105 controls the radio resource, and calculates a resource usage status of such as a radio NW (network), a HW (Hardware) and so forth. The interface 106 communicates with other radio base stations or with upper rank stations. At least part of processing by the signal processing unit 103, communication controller 104, resource management unit 105 and the interface 106 may be implemented by a program executed on a computer constituting the radio base station.

FIGS. 23A and 23B illustrate the operation of a radio base station (eNB) according to an Example of the present invention. Referring to FIG. 23A, it is supposed that, as explained in the above described exemplary embodiments, when a given event occurs, such as X2 connection request (X2 SETUP REQUEST), an eNB configuration update (eNB configuration update), new notification of CA configuration or update notification (YES of step S1), the radio base station then generates information including configuration information of the second carrier, load information of the second carrier (calculated by the load information calculation unit 107 of FIG. 22), or a resource usage status of the second carrier (generated by the resource management unit 105 of FIG. 22) (step S2). The radio base station then transmits the preset information to the other radio base station via the communication controller 104 and the interface 106.

Referring to FIG. 23B, in the other radio base station, when an event of receiving the information on the second carrier (configuration information of the second carrier, load information of the second carrier or resource usage status of the second carrier) occurs (YES of step S11), the other radio base station then receives the information by the interface 106 and the communication controller 104 (step S12), and then refers to the information to perform adjustment (scheduling) of the interference level or load balancing in connection with the second carrier (step S13). In the above described exemplary embodiments, the preset information of the second carrier is exchanged over the transmission link X2 between the radio base stations. It is however of course possible for the radio base station to inform the information to the base station control station or management devices (MME or O&M) as upper level devices and for the upper level devices to inform the information to the other radio base station.

The carrier ID in the above described exemplary embodiments may be used for information exchange not only between the radio base stations (eNBs) but also between the radio base station (eNB) and the radio terminal (UE).

For example, when the eNB initially notifies a UE of the information on the second carrier, the eNB notifies the UE of e.g., the frequency information, as the configuration information of the second carrier, while also adding the carrier ID.

If subsequently the configuration information of interest unchanged, the carrier ID is used as the information on the second carrier.

By so doing, the amount of information exchanged between the radio base station (eNB) and the radio terminal (UE) is able to be reduced. Such a method may be used in which a carrier ID is assigned not only to the second carrier not having the first identifier but also to the first carrier having the first identifier.

In the above described exemplary embodiments, the radio communication system is supposed to be of the 3GPP LTE system only for the sake of illustration. That is, the present invention may be applied to systems of 3GPP WCDMA (Wideband Code Division Multiple Access), GSM (Global System for Mobile communications) or WiMAX (Worldwide interoperability for Microwave Access).

The disclosures of the aforementioned Non-Patent Documents are incorporated by reference herein. The particular exemplary embodiments or examples may be modified or adjusted within the scope of the entire disclosure of the present invention, inclusive of claims, based on the fundamental technical concept of the invention. In addition, a variety of combinations or selection of elements disclosed herein may be made within the context of the claims. That is, the present invention may cover a wide variety of modifications or corrections that may occur to those skilled in the art in accordance with the entire disclosure of the present invention, inclusive of claims, and the technical concept of the present invention.

What is claimed:

1. A first base station comprising:
a memory; and
at least one hardware processor coupled with the memory, wherein the at least one hardware processor is configured to:
operate in two or more parts of a bandwidth for downlink, the two or more parts of the bandwidth comprising a first part associated with a first identifier identifying a serving cell and a second part associated with the first identifier, and
send, to a second base station, configuration information related to the second part,
wherein the configuration information comprises:
a second identifier identifying the second part,
first information indicating a bandwidth of the second part, and
second information identifying to the first part.

2. The first base station according to claim 1, wherein the first identifier is a Physical layer Cell Identifier or a Cell Global Identifier (CGI).

3. A method performed by a first base station, the method comprising:
configuring the first base station to operate in two or more parts of a bandwidth for downlink, the two or more parts of the bandwidth comprising a first part associated with a first identifier identifying a serving cell and a second part associated with the first identifier, and
sending, to a second base station, configuration information related to the second part,
wherein the configuration information comprises:
a second identifier identifying the second part,
first information indicating a bandwidth of the second part, and
second information identifying to the first part.

4. The method according to claim 3, wherein the first identifier is a Physical layer Cell Identifier or a Cell Global Identifier (CGI).

5. A user equipment (UE) comprising:
a memory; and
at least one hardware processor coupled with the memory, wherein the at least one hardware processor is configured to:
operate in two or more parts of a bandwidth for downlink, the two or more parts of the bandwidth comprising a first part associated with a first identifier identifying a serving cell and a second part associated with the first identifier, and
communicate, based on the two or more parts of the bandwidth, with a first base station configured to send configuration information related to the second part to a second base station
wherein the configuration information comprises:
a second identifier identifying the second part,
first information indicating a bandwidth of the second part, and
second information identifying to the first part.

6. The UE according to claim 5, wherein the first identifier is a Physical layer Cell Identifier or a Cell Global Identifier (CGI).

7. A method of a user equipment (UE), the method comprising:
configuring the UE to operate in two or more parts of a bandwidth for downlink, the two or more parts of the bandwidth comprising a first part associated with a first identifier identifying a serving cell and a second part associated with the first identifier, and
communicating, based on the two or more parts of the bandwidth, with a first base station configured to send configuration information related to the second part to a second base station,
wherein the configuration information comprises:
a second identifier identifying the second part,
first information indicating a bandwidth of the second part, and
second information identifying to the first part.

8. The method according to claim 7, wherein the first identifier is a Physical layer Cell Identifier or a Cell Global Identifier (CGI).

* * * * *